Dec. 15, 1959    B. CECCHI    2,916,870
DRAFTING APPARATUS FOR PREPARING ROVING FOR SPINNING
Filed May 6, 1957    6 Sheets-Sheet 2
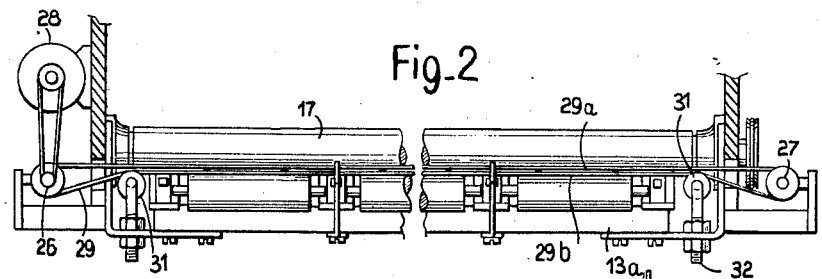
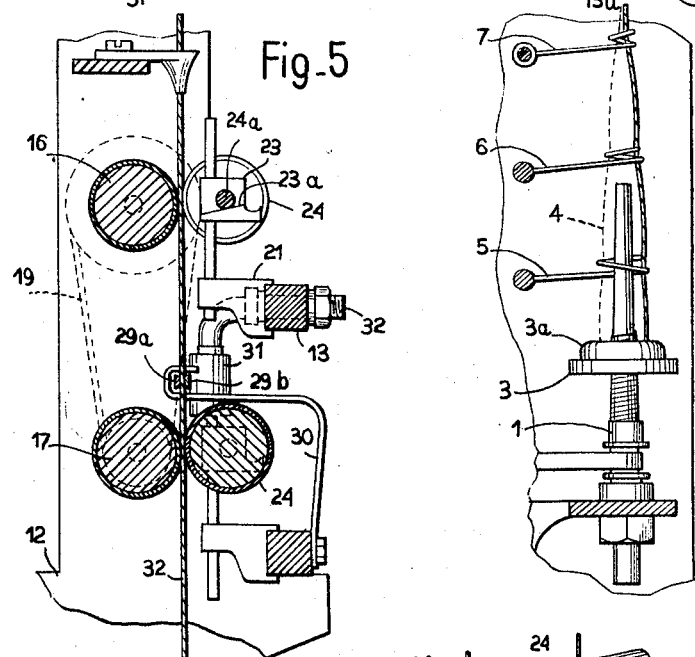
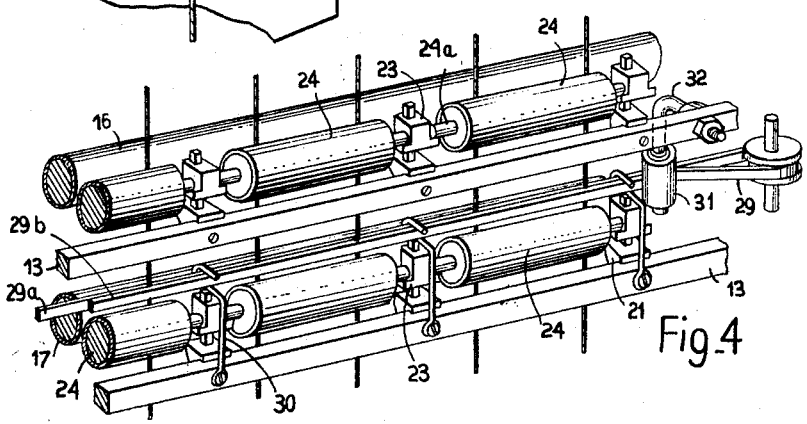
INVENTOR:
BRUNO CECCHI
By
Richardson, David and Newton
Atty's.

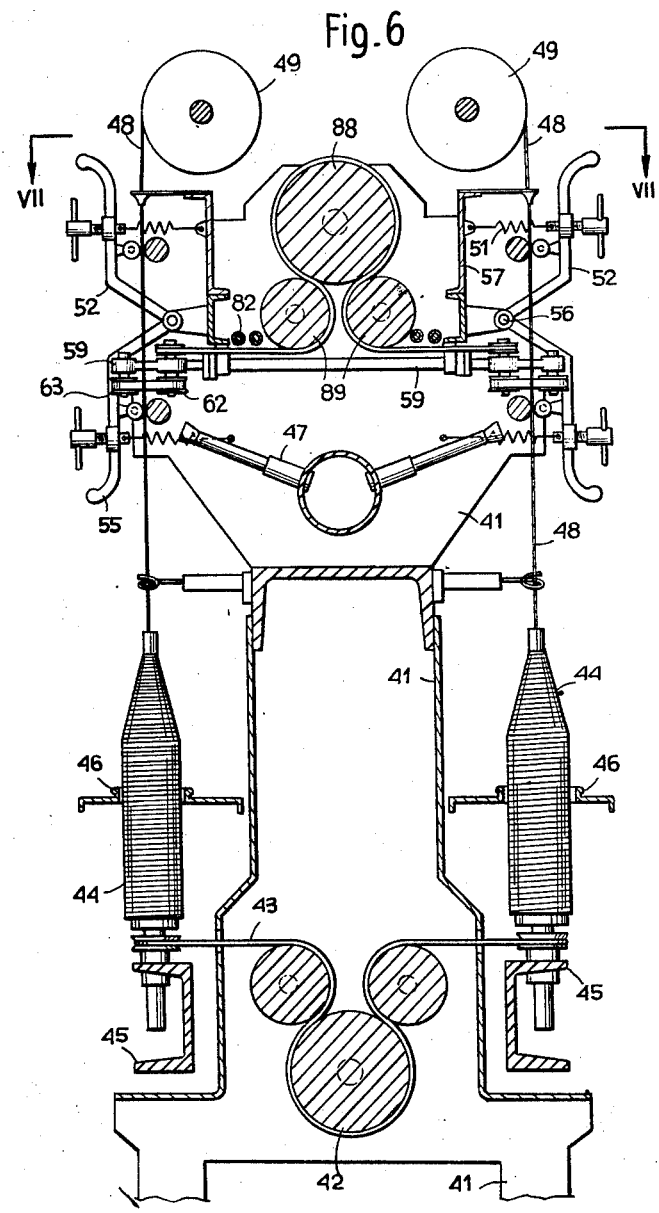

Dec. 15, 1959        B. CECCHI        2,916,870
DRAFTING APPARATUS FOR PREPARING ROVING FOR SPINNING
Filed May 6, 1957        6 Sheets-Sheet 4

INVENTOR:
BRUNO CECCHI

Dec. 15, 1959 B. CECCHI 2,916,870
DRAFTING APPARATUS FOR PREPARING ROVING FOR SPINNING
Filed May 6, 1957 6 Sheets-Sheet 5
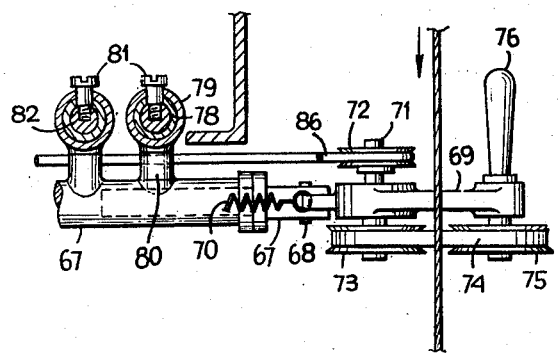
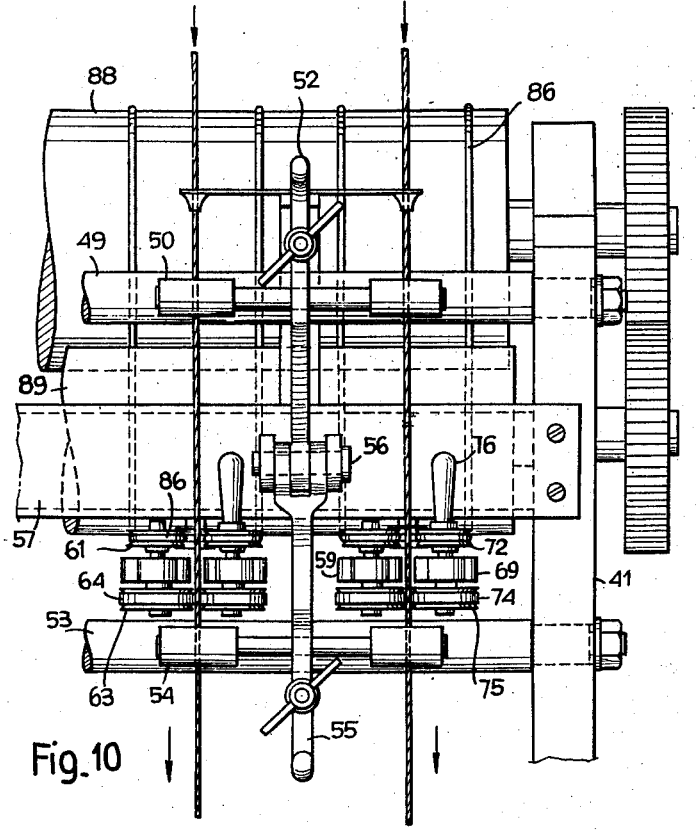
INVENTOR:
BRUNO CECCHI
By
Richardson, David and Nordon
ATTY'S.

Dec. 15, 1959     B. CECCHI     2,916,870
DRAFTING APPARATUS FOR PREPARING ROVING FOR SPINNING
Filed May 6, 1957     6 Sheets-Sheet 6
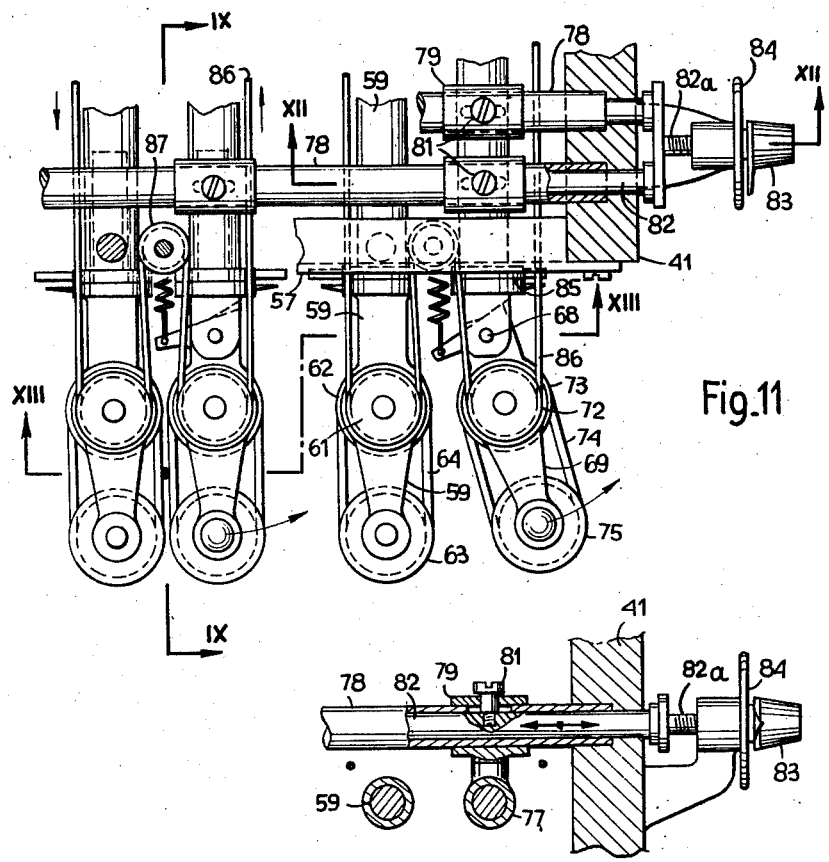
Fig. 11
Fig. 12
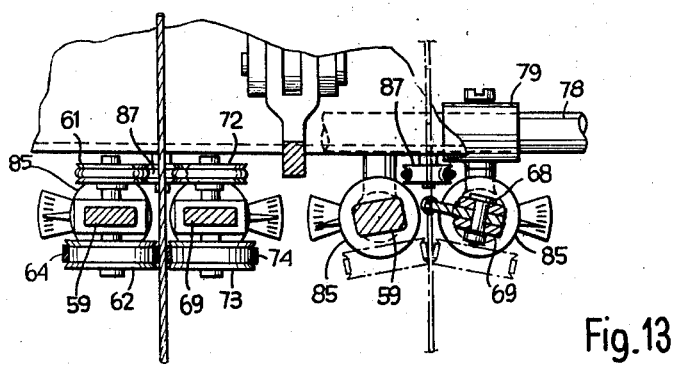
Fig. 13
INVENTOR:
BRUNO CECCHI
by
Richardson, David and Nordon
ATTY'S.

United States Patent Office 2,916,870
Patented Dec. 15, 1959

2,916,870

DRAFTING APPARATUS FOR PREPARING ROVING FOR SPINNING

Bruno Cecchi, Prato, Firenze, Italy

Application May 6, 1957, Serial No. 657,418

Claims priority, application Italy May 11, 1956

5 Claims. (Cl. 57—51.6)

The invention relates to an improvement in drafting apparatus designed to provide a false twist or temporary torsion in the roving or yarn preparatory to spinning or to its being supplied directly to a spinning frame.

According to the invention, the apparatus substantially includes a supply unit and a drafting unit, through which the roving to be drafted is passed, said units being adapted to determine a drafting of the roving in the length thereof included therebetween, and means for imposing a provisional apparent or false twist in correspondence of said length; these means being characteristically formed by two opposite branches of a flexible belt element or equivalent, said branches moving at the same speed in opposite directions transverse or substantially transverse in direction with respect to the trajectory movement of the roving, the roving passing between said branches which at least partly contact them. Consequently, during movement of the roving between the branches of the flexible element, each roving is submitted to a twist owing to the movements of said two branches of the flexible element, between which it is passed.

The two belt branches may be formed by two parallel branches of a single belt or any other equivalent endless flexible element, which may act upon the several rovings or for a single roving.

A false twist and drafting apparatus according to this invention, in a practical embodiment, includes, in the free trajectory length of the roving included between two pairs of drawing cylinders, a false twist means which is formed by two lengths of a belt located side by side to include the roving therebetween for action thereon. The belt or strap lengths are substantially perpendicular to the alignment of the roving being worked and are mounted and moved in such manner that they may be separated from each other in order to allow the introduction and handling of the roving and thus allow the re-approach of the two active lengths. The belt lengths are also mounted in such manner as to allow an adjustment of their spacing so as to allow adjustment for different qualities and types of roving being worked.

The two active belt lengths may be formed by two endless belts mounted on two pairs of pulleys, one of the pulleys being a driving pulley. The adjustment of the working space between the two belts is obtained by simultaneously moving the support of the pulleys of one of the belts of each false twist unit simultaneously with the others of the same machine.

A common flexible member for two belts may be provided for the rotational control of the belts of each unit. For instance, the common flexible member may be mounted upon two pulleys coaxial to the drive pulley. Particularly, a drive belt may be wound, upon a common drive drum, on a pulley integral to the drive pulley of one of the belts, and may be transmitted by a switching guide member and then once again by a pulley integral to the drive pulley of the other belt.

An endless spinning machine, actuated according to the invention, advantageously includes, in order to reduce the height of the machine, a single longitudinal drive drum or cylinder for all the drive belts of the false twist units. Each of the drive belts preferably controls two opposite false twist units. In the latter case, one endless drive belt is wound upon the drive drum, then on two pulleys integral with the drive pulleys of a first unit or set, then on an intermediate guide pulley, then on the pulleys integral with drive pulleys of the second unit or set, in addition to the associated intermediate guide pulley, thence to return to the drive drum.

A single roving may be submitted subsequently to several additional drafting stages in similar apparatus.

The invention will be better appreciated following the description together with the drawings which show certain embodiments which do not restrict the invention.

In the drawings:

Fig. 2 is a fragmentary sectional view taken along line II—II of Fig. 1;

Fig. 3 is an enlarged fragmentary sectional view taken along the line III—III of Fig. 1;

Fig. 4 is a fragmentary perspective view illustrating the false twist members of the supply device;

Fig. 5 is an enlarged fragmentary sectional view of Fig. 3;

Fig. 6 is a diagrammatic fragmentary sectional view of a spinning machine provided with single false twist sets used according to the invention;

Fig. 9 is a fragmentary sectional view taken along line IX—IX of Fig. 11;

Fig. 10 is a front elevational view taken along the line X—X of Fig. 8;

Fig. 11 is a fragmentary sectional view taken along the line XI—XI of Fig. 8;

Fig. 12 is a fragmentary sectional view taken along line XII—XII of Fig. 11; and Fig. 13 is a fragmentary sectional view taken along line XIII—XIII of Fig. 11.

Figure 1:
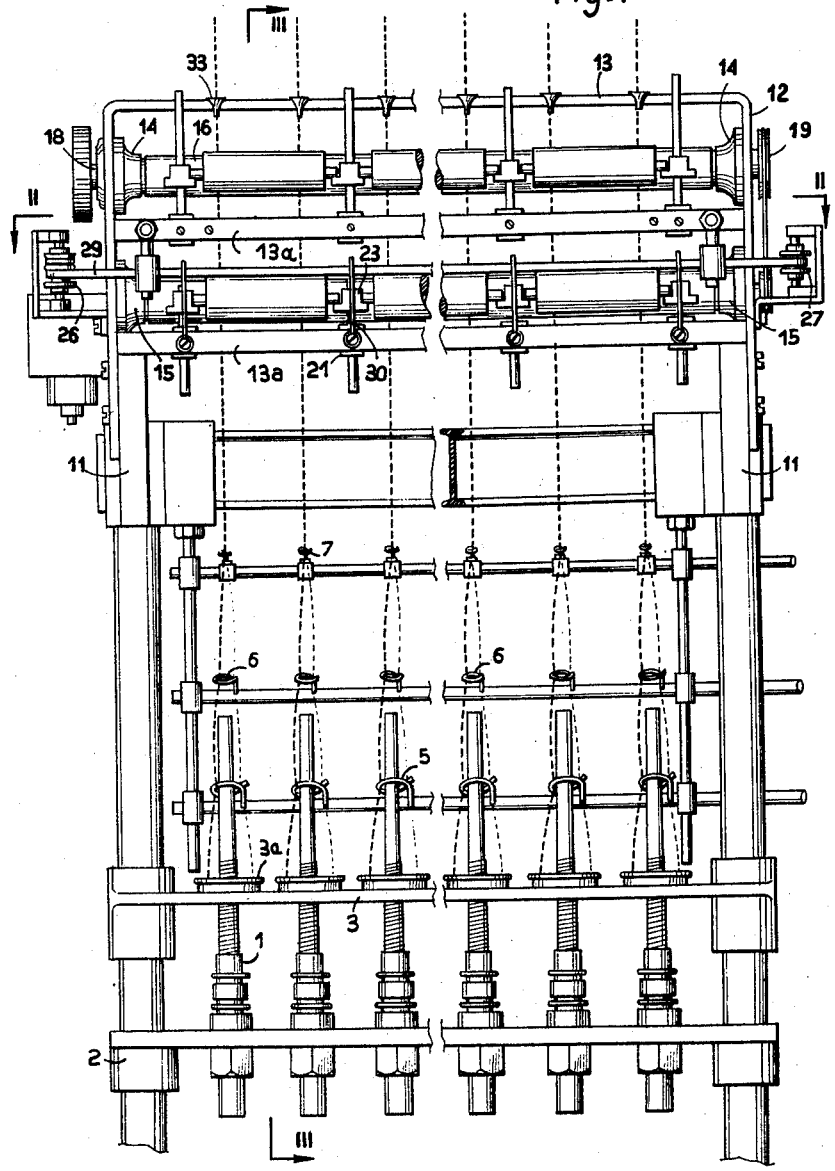
Figure 1 is a front elevational view of a diagrammatically illustrated spinning machine, with the drafting apparatus according to the invention.

In accordance with what is illustrated in Figs. 1 to 5, 1 denotes spindles carried by a bank 2 and cooperating with ring twist elements, formed by supports 3 which support the annular tracks 3a for small thread engaging rings 4, the threads being wound on the spindles 1. The arrangement is completed by guide loops 5, 6 and 7 and by reciprocal motion means for the distribution of the thread on the spindles and by other means.

The drafting apparatus according to the invention, which also serves in this instance for the supply, is located on upper supporting structure 11 of the machine. This apparatus includes a frame formed by flanks 12 and cross pieces 13, 13a. The flanks 12 carry support means 14 and 15, respectively, for two cylinders 16 and 17, suitably and rotatably driven in order to deliver a greater tangential speed to the cylinder 17, than the cylinder 16. For instance, the motion may be transmitted to the cylinder 16 by a gear 18 while from the cylinder 16 to the cylinder 17 it may be transmitted by means of a belt system 19 or the like, and preferably such as to allow the gradual variation of the gear ratio.

Supports 21, which are provided with studs 22, are applied to the cross pieces 13a. The studs 22 are provided with small blocks 23 forming pairs of inclined guides 23a. End pins 24a of small cylinders 24 are mounted in small adjacent blocks 23. The small cylinders thus may freely rotate and lie, by gravity, against the drive cylinders 16 and 17 respectively. The small cylinders 24, lying against the cylinder 17, are obviously given a rotational speed higher than the speed of the small cylinders 24, lying against the cylinders 16.

The cylinders 16, 17 and 24 may be coated by a material designed to give a required adherence.

Two transmission means 26—27 are mounted on the structure 12 and one of said means is rotatably driven. For example, the pulley 26 is driven by a small motor 28 or by another driving system synchronized or synchronizable with the machine, and with an appropriately adjusted speed, a belt 29, forming two parallel branches 29a and 29b, is entrained over the pulleys 26 and 27 or other equivalent transmission means. The two branches 29a and 29b extend parallel to the cylinders 16, 17. The branch 29a is suitably guided both by said pulleys 26 and by shoulder members 30, carried by the lower cross pieces 13 and shaped as clearly shown in Fig. 5 and which may be positionally adjusted. The branch 29b of the belt 29 is guided by a pair of rollers 31 mounted on square stirrups 32 likewise mounted in an adjustable manner by means of a nut or locknut on one of the stirrups 13. The trajectory of the two branches 29a and 29b of the belt may be accurately adjusted in this manner with respect to the two pairs of rollers 16, 24 and 17, 24 and one pair with respect to the other. The latter adjustment may also be dependent upon the thickness of the roving 32 which is to be spun.

The assembly may be adjusted with respect to the pair of cylinders, particularly in order to modify the distance from the drafting cylinders.

The belt or equivalent flexible element may have a cross-sectional profile which is adapted to allow the introduction of the roving between the two branches thereof.

The rovings, guided by appropriate threaded guides 33 on the upper cross piece, pass through two pairs of rollers 16, 24 and 17, 24, and are slightly unwound in the trajectory length included between the two pairs of rollers. This trajectory length of the rovings passes between the two branches 29a, 29b of the belt 29, the branches moving transversally with respect to the roving and one in a direction opposite to the other. By means of the adjustment of the spacing between the two branches 29a and 29b, a winding action is imparted to the rovings by the facing surfaces of said two belt branches, whereby a false twist effect is obtained.

Suitable tensioning means for the belt will be provided and also suitable guide means therefor along the branch 29b will be provided in order to allow appropriate introduction of the rovings between the two belt branches, both in the initial overall operation and during the working of the same in the case of a breakdown of the single roving.

A particularly appropriate position of the belt with respect to the pairs of cylinders, in the extending direction of the rovings, is that shown in the drawing, that is, adjacent to the pair of lower cylinders. However, such position which may be modified according to several factors which may have a role in the spinning, and in particular in relation to the maximum length of the fibres present in the roving.

The active belt branches or their equivalents may be accurately opposed or offset.

Figure 7:
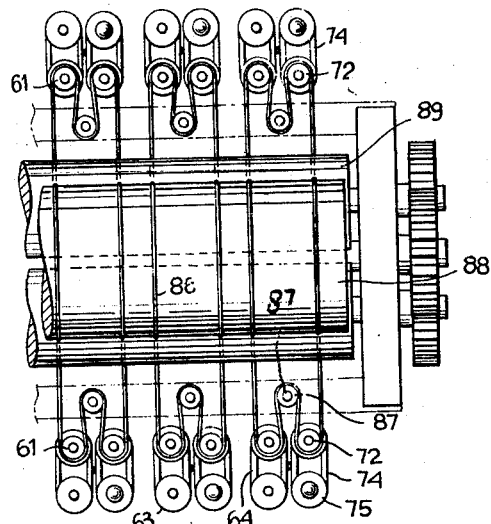
Fig. 7 illustrates a fragmentary sectional view taken along line VI—VI of Fig. 6.
Figure 8:
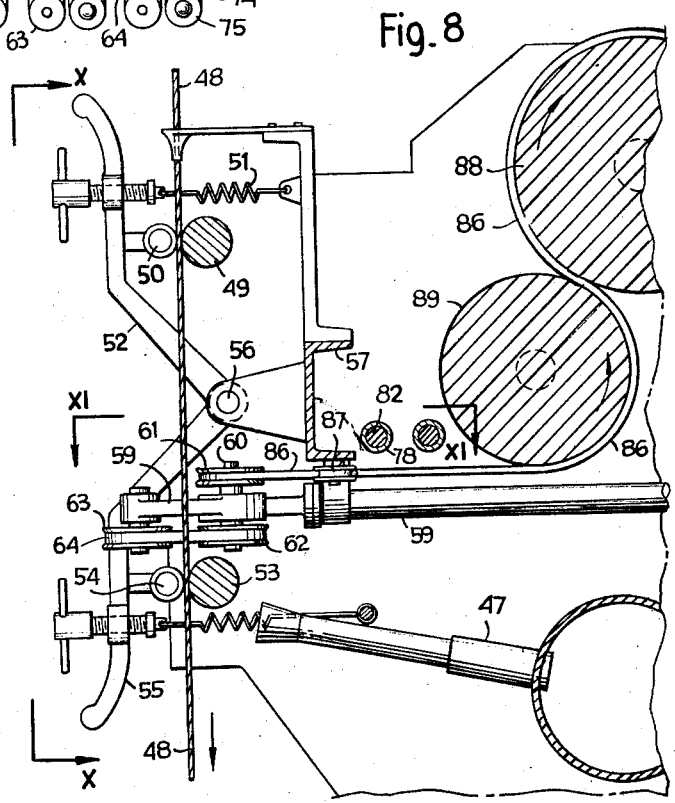
Fig. 8 is an enlarged fragmentary sectional view showing details of Fig. 6.

With reference to Figs. 6 to 13, there is provided a stationary frame 41, a longitudinal drive cylinder 42, by which and with the aid of belts 43 and spindles 44, carried by the banks 45, are rotatably driven, in such manner that the threads twisted by the rings mounted on annular tracks 46 are wound on the spindles 44 in a known manner. Above the frame 41, in addition to a pneumatic roving drafting system 47, there is a false twist unit where the roving 48 arrives, either being unwound from beams or being directly unwound from divider rubbers.

Each false twist unit includes a drive cylinder 49 of a first pair of twist rollers or cylinders, of which the second cylinder 50 is resiliently stressed by a spring 51 acting on a lever 52. The numeral 53 denotes the drive cylinder of the pair of drafting cylinders underlying the false twist unit and co-operating with a pressure cylinder 54 carried by a lever 55 similar to the lever 52. The two levers 52 and 55 are pivoted at 56 to a beam 57. Each unit includes a stationary support 59 which forms the seat for a bearing for a small shaft 60, on which an upper pulley 61 and a lower pulley 62 are mounted. The support 59 also forms a seat for a pin which carries a second pulley 63 aligned with the pulley 62. An endless belt 64 is wound on the pulleys 62 and 63. A support 67 is provided on each end of the support 59 and said supports 67 each carry a hinged link 68 which also forms a rabbet stop, against which an arm 69 lies and the arm 69 is resiliently stressed, for example, by a spring 70 against said link or rabbet. The arm 69 is provided with a seat for the bearing of a small shaft 71, on which an upper pulley 72 and a lower pulley 73 are affixed, a small belt 74 being entrained on the pulley 73 and a second pulley 75 also carried by the member 69. A control handle 76 facilitates the movement of the member 69 against the action of the spring 70. When the arm 69 is located in the stop position against the support 67, the two adjacent branches of the two belts 64 and 74 are ready to act on the roving 48, which is passed therebetween, the two belts 24 and 34 being wound in such manner that the two active adjacent branches move in reverse directions.

The arm 69 may be moved away from the link by means of the handle 76 through angular displacement around the pivot 68 so as to move the belt 74 away from the belt 64 and thus allow manual operations on the roving or the introduction of the roving into the working position. The opening position may be found and maintained by setting up a dead point with respect to the operating line of the spring 70 or with another stopping system. In any event, the proper position of the arm 69 is defined by the stop between members 69 and 67.

The distance between the active branches of the two belts 64 and 74 is simultaneously adjusted for all the false twist units by mounting the supports 67 upon an adjustable structure. This adjustable structure includes a tubular member 78 adjacent each row of the spindles and false twist units. Sleeves 79 are slidably mounted on the tube 78 and the sleeves, through the studs 80, are fixed to the supports 67. All the sleeves 79 are fixed by means of screws 81 to stems 82 slidably mounted in the interior of the tube 78, the screws 81 passing through the tube 78 in longitudinally elongated slots. Therefore, in accordance to what has been above described, when the stem 82 is axially moved, the supports 67 are simultaneously moved and all the belts 74 are moved away or toward the belts 64. The two stems 82 associated to the two fronts of a machine or to the two sleeves 79 of each support 67 may be simultaneously controlled by any appropriate manner, and the adjustment may take place, for example, through a screw coupling 82a controlled by an outer control knob 83 and through the aid of a dial 84 provided with pointers. The two small belts 64 and 74 are also adjustable according to their inclination, through a rotational coupling between the parts of the supports 59 and 67, directly or indirectly engaged to the machine's structure and the parts of said supports which carry the pairs of pulleys for the belts 64 and 74. Coupling plates 85 located between said parts allow the estimate of the mutual angular position of the two belts. Fig. 13 illustrates two possible mutual angular positions of the two belts 64 and 74.

The two belts 64 and 74 of each unit are driven by the associated pulleys 62 and 73. The driving of said drive pulleys is obtained through a flexible member such as a belt 86 which is entrained over the two pulleys 60 and 72 and over guide pulleys 87 located between the two pulleys and inwardly thereof and whose axis is sufficiently near to the axis of its associated hinge 68. The belts 86 simultaneously each drive two units or sets which correspond to the two working opposite alignments or sections of the machine. In fact, each belt 86 is entrained over a drive cylinder 88 and on two symmetrical transmission cylinders 89, and then over the two pulleys 72 and 60 of a unit or set, then over the associated guide pulley 87, then over the pulleys 77 and 60 and the associated guide pulley 87 of the other unit or set and then again over the cylinders 49. Therefore, a single belt 86 controls two units and each of said units may be actuated in order to diverge the working belts 74 and 64 without having to move the belt 86, as the arrangement of the guide pulleys 87 allows the angular operation of the members 69 without causing any dangerous drawing of the belts 86.

The position of the pairs of belts 64 and 74 which are perpendicular to the operating fronts defined by the spindles 44 and the possibility of diverging the two active branches of the belts allows a very easy handling operation of the roving with reference to the false twist unit.

While only certain forms of the invention have been shown and described herein, it will be readily apparent to those skilled in the art that many minor modifications may be made without departing from the spirit of the invention or the scope of the appended claims.

What I claim is:

1. Drafting apparatus for effecting a false twist in rovings comprising a pair of supply cylinders, a pair of receiving cylinders, means for rotating said receiving cylinders at a greater rate of speed than said supply cylinders, said rovings extending through said pairs of cylinders, a flexible belt having a pair of parallel branches extending transversely with respect to the path of movement of said rovings and in frictional contact therewith, and means for moving said branches of said belt in opposite directions.

2. An apparatus as defined in claim 1 wherein said branches of said belt are positioned adjacent said receiving cylinders.

3. In a drafting apparatus for effecting false twists in a plurality of rovings and including a pair of feed cylinders, a pair of drafting cylinders, and means for rotating said drafting cylinders at a speed greater than that of said feed cylinders, said rovings extending through said pairs of cylinders, the provision of a pair of endless belts arranged each at either side of and in frictional contact with each length of roving extending between said cylinders, and means for moving each pair of said belts in opposite directions in paths transverse to the path of movement of its respective roving.

4. In a drafting apparatus for effecting false twists in a plurality of rovings and including a frame, a pair of feed cylinders extending along each side of said frame, a pair of drafting cylinders extending along each side of said frame, means for rotating said drafting cylinders at speeds greater than the speed of said feed cylinders, and rovings extending in spaced parallel relationship on each side of said frame through the pairs of their associated cylinders, the provision of a plurality of endless belts each extending transversely in said frame between the feed and drafting cylinders and each provided with two pairs of opposed branches, said opposed branches each being in frictional contact with opposite sides of a single roving.

5. An apparatus as defined in claim 4 wherein manual means is provided for moving one of the branches of each pair of branches out of contact with its associated roving.

References Cited in the file of this patent

UNITED STATES PATENTS

| | | |
|---|---|---|
| 2,098,974 | Repass | Nov. 16, 1937 |
| 2,262,589 | Peck | Nov. 11, 1941 |
| 2,863,280 | Ubbelohde | Dec. 9, 1958 |

FOREIGN PATENTS

| | | |
|---|---|---|
| 416,979 | Great Britain | Sept. 21, 1934 |